United States Patent [19]

Iwata

[11] Patent Number: 4,765,016

[45] Date of Patent: Aug. 23, 1988

[54] CHIP REMOVING DEVICE

[75] Inventor: Yukio Iwata, Saitama, Japan

[73] Assignee: Akebono Brake Industry Co., Ltd., Tokyo, Japan

[21] Appl. No.: 98,461

[22] Filed: Sep. 18, 1987

[30] Foreign Application Priority Data

Sep. 22, 1986 [JP] Japan .................. 61-224312

[51] Int. Cl.$^4$ ............................................. B23D 79/06
[52] U.S. Cl. .................................. 15/246; 15/93 R;
15/304; 29/81 J; 29/81 K; 29/76.1; 51/34 J;
51/273
[58] Field of Search ............... 15/93 R, 246, 311, 304;
29/76 A, 76 R, 81 J, 81 K, 81 R; 51/34 J, 273

[56] References Cited

U.S. PATENT DOCUMENTS

| 2,486,555 | 11/1949 | Cordell | 51/273 |
| 3,868,791 | 3/1975 | Burns | 51/34 J |
| 4,706,324 | 11/1987 | Goodspeed | 15/93 R |

FOREIGN PATENT DOCUMENTS 2238333 3/1973 Fed. Rep. of Germany ....... 51/34 J 1250333 8/1986 U.S.S.R. ........................... 15/236 R Primary Examiner—Harvey C. Hornsby
Assistant Examiner—C. Reinckens
Attorney, Agent, or Firm—Cushman, Darby & Cushman

[57] ABSTRACT

A chip removing device for removing foreign matter such as chips from a groove defined circumferentially on an inner peripheral surface of a cylindrical workpiece, which includes a blowhead that is fittable into the cylindrical workpiece, a shaft for supporting the blowhead and a motor for rotating the blowhead and a motor for rotating the blowhead. A movable member having a scraper defined on one end thereof is mounted for movement within the blowhead and has a passage defined therein for supplying compressed air to a nozzle adjacent to the scraper. In operation, the blowhead is inserted into an interior cavity of a workpiece, the movable member is extended outwardly and the blowhead is rotated to cause the scraper to remove foreign matter from a groove that is defined in a inner peripheral surface of the workpiece, while compressed air is simultaneously applied to help loosen the foreign matter.

12 Claims, 2 Drawing Sheets

CHIP REMOVING DEVICE

BACKGROUND OF THE INVENTION

1. Field of the Invention

The present invention relates to a Chip Removing Device for removing foreign matter such as chips from a circumferentially defined groove in an inner peripheral surface of a cylindrical workpiece. More particularly, the present invention relates to an apparatus for removing chips from a cylindrical inner peripheral surface of the caliper body of a disc brake.

2. Description of the Prior Art

The caliper body in a disc brake commonly has an integral cylinder for receiving a piston, which may be actuated to press a friction pad against the rotor of the brake. In order to seal the brake fluid in the cylinder, such caliper bodies usually have a seal groove defined therein for receiving a ring-shaped seal member. In addition, many prior art caliper body cylinders commonly have a boot groove defined therein for receiving a boot which prevents water, sand or dust from entering the cylinder.

The seal in boot grooves are most often formed by machining the groove into the inner surface of the caliper body cylinder after the caliper body has been formed. However, due to the nature of the machining process, it is common for cutting chips to remain in the grooves after forming. Since these chips would cause the brake to fail in operation if left in the grooves, it has been customary to remove the chips from the grooves manually with an pick shaped tool and an air gun. However, removing the chips manually is tedious, time consuming and difficult to confirm, since the worker who performs the procedure must visually inspect the grooves to ascertain whether any chips remain therein. In addition, the manual chip removing process may expose the worker to injury from flying chips.

SUMMARY OF THE INVENTION

In view of the aforesaid disadvantages of the prior art, it is an object of the present invention to provide a chip removing device which is capable of removing chips and other foreign matter from grooves defined within the cylinder of a caliper body in a disc brake, without relying on a manual cleaning process.

According to the present invention, an apparatus for removing foreign matter from one or more circumferential grooves defined in an inner peripheral surface of a workpiece includes a frame for securing the workpiece thereto; a rotatable blowhead having a cylinder defined therein, the axis of the cylinder being substantially perpendicular to the axis of rotation of the blowhead; a motor for rotating the blowhead; a movable body disposed in the cylinder having a scraper defined on a first end thereof; a compressed air device for lifting the blowhead in the direction of its axis of rotation so that it may be positioned within the interior cavity of the workpiece; and means for moving the movable body in the cylinder, wherby the movable body may be extended so as to cause the scraper to remove foreign matter from the grooves.

In addition, the present invention provides a method of removing foreign matter from one or more grooves defined in an inner peripheral surface of a workpiece including securing the workpiece to the frame; advancing the blowhead into the interior cavity of the workpiece; rotating the blowhead; extending the movable member having the scraper defined thereon outwardly from the blowhead so that the scraper removes foreign matter from one or more of the grooves; retracting the movable member back into the blowhead, and withdrawing the blowhead from the interior cavity of the workpiece.

The method and apparatus of the present invention further provide for compressed air to be supplied to the movable member through a nozzle near the scraper to further assist in removing foreign matter from the grooves.

Other objects, features and characteristics of the present invention, as well as the methods and operation and functions of the related elements of the structure and to the combination of parts and economies of manufacture, will become apparent upon consideration of the following description in the appended claims, with reference to the accompanying drawings, all of which form a part of this specification, wherein like reference numerals designate corresponding parts in the various figures.

DETAILED DESCRIPTION OF THE PREFERRED EMBODIMENT

Figure 1:
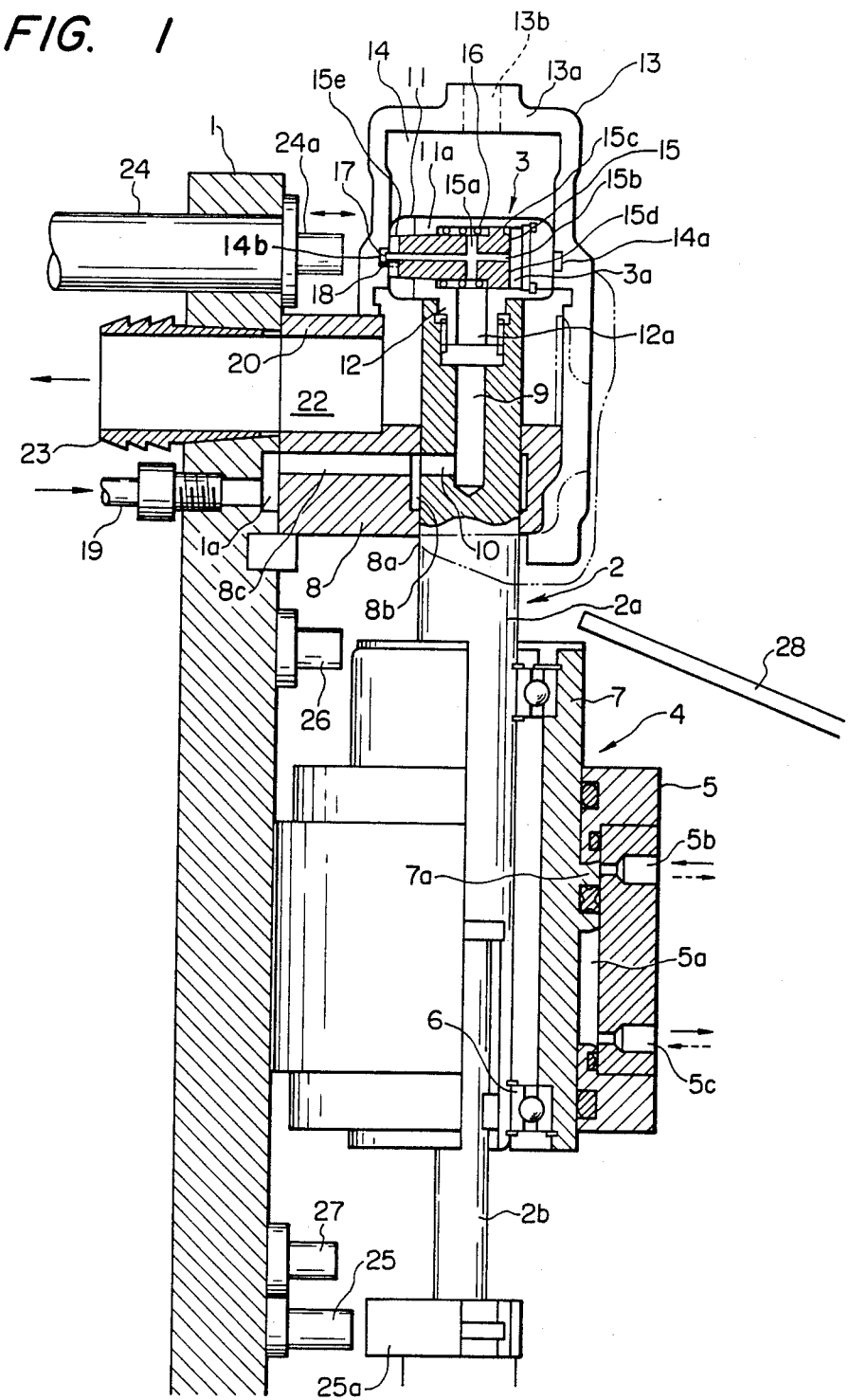
FIG. 1 is a sectional side elevational view of a chip removing device according to an embodiment of the present invention.

Referring to FIG. 1, a chip removing device according to the present invention includes a main body having a vertical frame 1 supporting on a front side a vertical shaft 2 which is vertically movable with respect to the frame 1 and is rotatable about its own axis. The vertical shaft 2 comprises an upper shaft portion 2a with a blowhead 3 being detachably mounted thereto and a lower shaft portion 2b having its lower end coupled to a drive motor (not shown) for rotating the shaft 2. The lower end of the upper shaft 2a and the upper end of the lower shaft 2b are coupled to each other in a spline-type arrangement such that they are relatively movable in the axial direction, but are rotatably fixed to each other. In this way, torque that is applied to the lower shaft 2b is transmitted to the upper shaft 2a to rotate the blowhead 3.

The upper shaft 2a along with the blowhead 2 may be vertically moved by a lifting/lowering mechanism 4 which includes an outer cylindrical tube 5 fixed to the frame 1 in an inner cylindrical tube 7 provided within the outer tube 5. The upper shaft 2a extends through and is supported within the inner cylindrical tube 7 by means of bearing 6. The outer tube 5 has a circumferentially extending recess 5a defined in its inner peripheral surface and the inner tube 7 has a flange 7a on its outer peripheral surface for engaging the recess 5a in the outer tube 5. When compressed air is supplied into the recess 5a through a hole 5b defined in the side wall of the outer tube 5, the inner tube 7 is lowered to move the upper shaft portion 2a downwardly. When compressed air is supplied into the recess 5a through a hole 5c defined in the side wall of the outer tube 5, the inner tube 7 is lifted to move the upper shaft 2a upwardly.

The upper shaft 2a is rotatably supported by a support member 8, which, as shown in FIG. 1, has one end attached to the frame 1. The support member 8 has a hole 8a defined therein for receiving the outer peripheral surface of the upper shaft 2a. A recess 8b is circumferentially defined in the inner peripheral surface of the hole 8a, and has a length that is slightly larger than the stroke of vertical movement of the upper shaft 2a. The support member 8 also has an air hole 8c defined at one end thereof for supplying the recess 8b with compressed air.

The upper shaft 2a has a first hole 9 defined in its upper surface extending downwardly from the top end and a second air hole 10 which extends radially from the lower end of the first air hole 9. The second air hole 10 opens out into the recess 8b which is defined in the inner peripheral surface of the hole 8a in the support member 8.

The blowhead 3 mounted on the top of the upper shaft 2a comprises a head portion 11 and a support shaft portion 12 that is integral with the lower portion of the head 11 and has a threaded outer peripheral surface. The blowhead 3 is fixed to the upper shaft 2a by threading the support shaft portion 12 into the first air hole 9 of the upper shaft 2a. The support shaft portion 12 has a hole 12a defined therein through which compressed air from the first air hole 9 may be supplied to the head portion 11.

The head portion 11 of the blowhead 3 is preferably in the form of a hollow disc that has a diameter slightly smaller than the inside diameter of a cylinder 14 of a caliper body 13. A radially movable body 15 which has a cylindrical shape is disposed in the head portion 11, which has defined therein a vertical hole 15a which communicates with the hole 12a of the support shaft 12. The body 15 further has a horizontal hole 15b defined therein for communicating with the vertical hole 15a and has an engaging step 15c on a rear end thereof which engates one end of a compression spring 16. A step 11a is formed on a front portion of an upper inner peripheral surface of the head portion 11 for engaging a second end of the compression spring 16, whereby the movable body 15 is biased relative to the head portion 11 in a direction that is toward its rear end, or to the right, as is shown in FIG. 1.

When compressed air is supplied through the hole 12a to the movable body 15, the movable body 15 is moved in a direction toward its front end against the resilient biasing of the compression spring 16. More specifically, compressed air which is supplied via the vertical hole 15a into the horizontal pasage 15b is ejected from the rear end surface 15d of the movable body 15 into an air chamber 3a behind the movable body 15, thereby pushing the movable body 15 toward its front end, which is to the left as is shown in FIG. 1.

A scraper 18 is mounted on a front end surface 15e of the movable body 15, as is shown in FIG. 1. In addition, the horizontal passage 15b terminates in a nozzle 17 which is adjacent to the scraper 18. As the movable body 15 is moved toward its front end, the nozzle 17 and the scraper 18 may be fitted into a seal groove 14a which is defined in the inner peripheral surface of the cylinder 14 in the workpiece.

Figure 2:
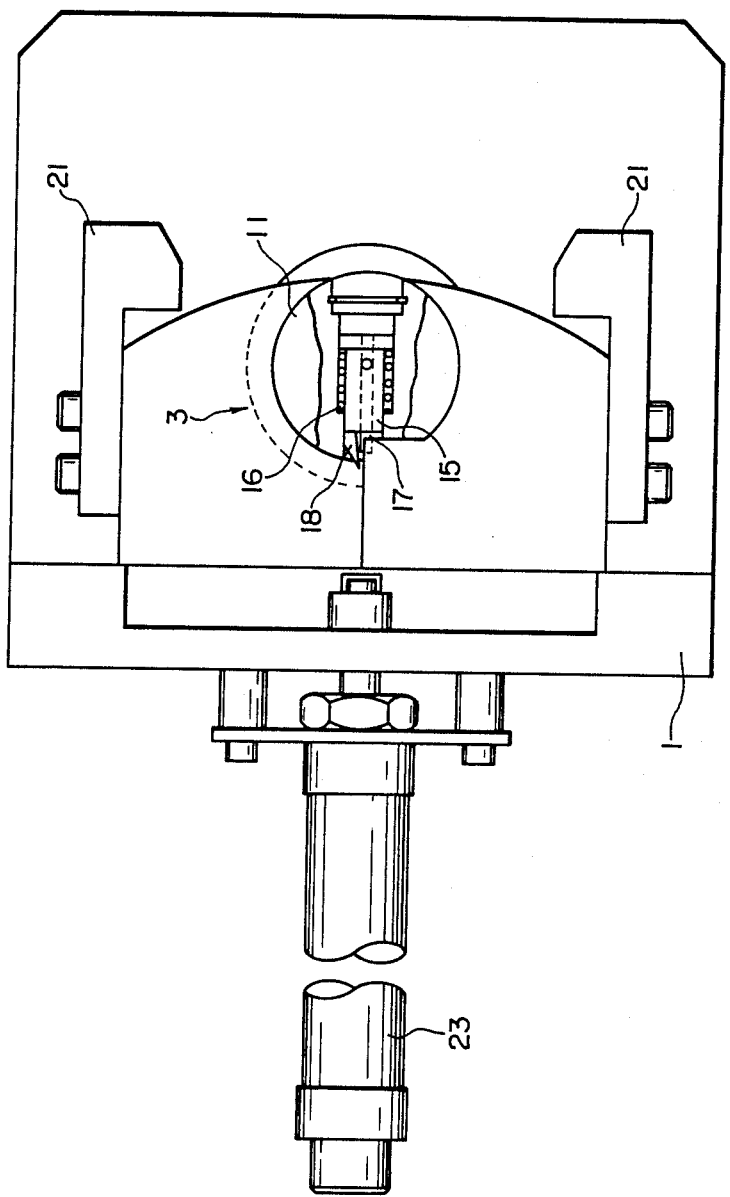
FIG. 2 is a plan view, partly cut away, of the chip removing device illustrated in FIG. 1.

As shown in FIG. 2, the scraper 18 may be in the shape of a tapered finger in order to scrape foreign matter, such as chips, from the seal groove 14a. The scraped off foreign matter may then be blown away by compressed air which is supplied from the nozzle 17.

An air pipe 19 for supplying compressed air to the blowhead 3 is connected to an air hole 1a defined in the frame 1. The compressed air may be fed from the air pipe 19 to the blowhead 3 through the air hole 8c of the support member 8, which communicates with the air hole 1a.

A workpiece table 20 projects forwardly from the frame 1 and is disposed upwardly of the support member 8 for supporting thereon an edge of an open end of the cylinder 14 of the workpiece caliper body 13. The workpiece caliper body 13 is supported so as to be vertically movable on a pair of arms 21 which are provided on an upper portion of the support member 8, and also on the workpiece table 20, as is shown in FIG. 2, with the cylinder head 13a of the caliper body 13 being directed upwardly. With the workpiece caliper body 13 thus positioned, the axis of the cylinder 14 may be aligned with the axis of the blow head 3. When the upper shaft 2a is in a lower position, the top surface of the blowhead 3 lies flush with the upper surface of the workpiece table 20. When the caliper body 13 is placed in position, an air gap 22 defined between the frame 1 and the support member 8 is vented to atmosphere through a space between the outer peripheral surface of the head portion 11 and the inner peripheral surface of the cylinder 14, the interior space of the cylinder 14 and a hole 13b for suppling fluid to the cylinder 14, as is shown in FIG. 1. Air from the cylinder 14 may be drawn through an air suction pipe 23, which extends through the vertical frame 1.

A workpiece ejector 24 which includes a pneumatic cylinder device is mounted on an upper end of the frame 1 and has a pusher rod 24A for pushing the workpiece caliper body 3 horizontally, forwardly off of the workpiece table 20 and arms 21 onto a slanted table 28.

A first proximity switch 25 is mounted on the frame 1. When a cam 25a attached to the lower shaft 2b approaches the first proximity switch 25, it generates a signal to stop the supply of compressed air to the air pipe 19, which deenergizes the motor to stop the rotation of the lower shaft 2b, which enables the lifting/lowering mechanism 4 to lower the upper shaft 2. In this way, rotation of the shaft 2 is stopped after it has made one revolution, at which point it then starts to move downwardly.

A second proximity switch 26 is also mounted to the frame 1 for supplying compressed air to the air pipe 19 and energizing the motor to rotate the shaft 2 upon detecting when the upper shaft 2a is elevated to a prescribed position.

When a third proximity switch 27 mounted on the frame 1 detects downward movement of the upper shaft 2a, it actuates the workpiece ejector 24 to push the workpiece caliper body 13 onto the slanted table 28.

In operation, the present invention operates as follows. After the caliper body 13 is set in position, a start switch is pressed to supply compressed air into the hole 5c of the lifting/lowering mechanism 4 to elevate the upper shaft 2a for bringing the blowhead 3 into the cylinder 14 of the workpiece.

When the ascent of the upper shaft 2a is detected by the second proximity switch 26, the motor for rotating the lower shaft 2b is energized to rotate the blowhead 3 and compressed air is supplied to the air pipe 19 to enable the nozzle 17 and the scraper 18 to project from a side of the head portion 11 of the blowhead 3 into the seal groove 14a of the cylinder 14.

In this way, chips and other foreign matter are removed from the seal groove 14a of the workpiece cylinder 14 by the scraper 18 and are blown out of the seal groove 14a by compressed air which is emitted from the nozzle 17. The removed chips and foreign matter are then discharged through the air suction pipe 23.

When one complete revolution of the blowhead 3 is detected by the second proximity switch 25, the supply of compressed air to the air pipe 19 is shut of, the nozzle 17 and scraper 18 are retraced into the head portion 11 and the lifting/lowering mechanism 4 is then actuated to lower the upper shaft 2a so that the blowhead 3 is withdraw inform the cylinder 14 of the workpiece caliper body 13.

When the upper shaft 2a arrives at a prescribed lower position that is detected by the third proximity switch 27, the workpiece ejector 24 is operated to cause the workpiece caliper body 13 to be ejected onto the slanted table 28.

While in the embodiment illustrated in FIGS. 1 and 2, the nozzle 17 and the scraper 18 are positioned for removing foreign matter from the seal groove 14a, in a second embodiment another pair of nozzles 17 and scrapers 18 may also be provided for removing foreign matter from a boot groove 14b of the cylinder 14, so that foreign matter can be cleared away from the seal and boot grooves 14a, 14b simultaneously.

The chip removing device of the present invention may be covered in its entirety with a case for providing an increased hermetical sealing capability to discharge foreign matter such as chips effectively.

While the invention has been described in connection with that is presently considered to be the most practical and preferred embodiment, it is to be understood that the invention is not limited to the disclosed embodiment, but, on the contrary, is intended to cover various modifications and equivalent arrangements included within the spirit and scope of the appended claims. For examples, the present invention is not limited to the illustrated embodiment, but may also be applicable to remove foreign matter from a circumferential groove found in the inner peripheral surface of any type of workpiece that has an interior cavity.

What is claimed is:

1. An apparatus for removing foreign matter from one or more circumferential grooves defined in an inner peripheral surface of a workpiece having an interior cavity comprising:
   a frame having means for securing a workpiece thereto;
   means rotatable with respect to said frame about an axis of rotation and having a cylinder defined therein, with an axis of said cylinder being substantially perpendicular to axis of rotation;
   means for rotating said rotatable means;
   a movable body in said cylinder having a scraper defined on a first end thereof;
   means for lifting said rotatable means and said movable body in the direction of said axis of rotation; and
   means for moving said movable body in said cylinder, whereby the rotatable means may be positioned within the inner cavity of the workpice, and the movable body may be extended so as to cause the scraper to remove foreign matter from one of the grooves.

2. Apparatus according to claim 1, wherein said movable body has an air channel defined therein communicating with said cylinder at a first end and terminating at its second end near said scraper to form a nozzle, and wherein said moving means comprises means for supplying compressed air to said cylinder, whereby compressed air is forced through said nozzle when the scraper is moved toward a groove to help remove foreign matter from the groove.

3. Apparatus according to claim 2, wherein said moving means further comprises means for biasing said first end of said movable member toward said axis of rotation.

4. Apparatus according to claim 1, wherein said lifting means is powered by compressed air.

5. Apparatus according to claim 2, further comprising means for sensing when said rotatable means has made one complete revolution, and means responsive to said first means for deactivating said rotating means and said means for supplying compressed air.

6. Apparatus according to claim 2, further comprising second means for sensing the position of said lifting means, and means responsive to said second means for activating said rotating means and said means for supplying compressed air when said lifting means is in a first uplifted position.

7. Apparatus according to claim 1, further comprising means for ejecting the workpiece from the frame.

8. Apparatus according to claim 7, further comprising third means for sensing downward movement of said lifting means, and means reswponsive to said third means for actuating said ejecting means.

9. A method of removing foreign matter from one or more grooves defined in an inner peripheral surface of a workpiece having an interior cavity, comprising:
   (a) securing the workpiece to a fixed frame;
   (b) advancing a rotatable blowhead into the interior cavity of the workpiece;
   (c) rotating the rotatable blowhead;
   (d) extending a movable member having a scraper defined on a first end portion thereof outwardly from the rotatable blowhead so that the scraper removes foreign matter from one or more of the grooves.

10. A method according to claim 9, further comprising the steps of:
   (e) retracting the movable member into the blowhead; and
   (f) withdrawing the blowhead from the interior cavity of the workpiece.

11. A method according not claim 10, further comprising the step of:
   (g) ejecting the workpiece from the frame after the blowhead has been with drawn from the interior cavity of the workpiece.

12. A method according to claim 9, further comprising the step of blowing compressed air through a channel in the movable member through a nozzle to help clear foreign matter from the groove, simultaneously with step (d).

* * * * *